(12) United States Patent
Ryan et al.

(10) Patent No.: US 8,402,051 B2
(45) Date of Patent: Mar. 19, 2013

(54) CONSUMER SHARE QUOTA FEATURE

(75) Inventors: Michael Ryan, Woodinville, WA (US); Joseph Frank, Boulder, CO (US); Brian Foster, Haverhill, MA (US); Brian Gruttadauria, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 478 days.

(21) Appl. No.: 12/349,372

(22) Filed: Jan. 6, 2009

(65) Prior Publication Data

US 2010/0174745 A1    Jul. 8, 2010

(51) Int. Cl.
*G06F 17/30* (2006.01)

(52) U.S. Cl. ............................ 707/770; 707/831

(58) Field of Classification Search ............ 707/783, 707/812, 831, 770
See application file for complete search history.

(56) References Cited

U.S. PATENT DOCUMENTS

2005/0251516 A1* 11/2005 Stakutis et al. ............... 707/10
2007/0088760 A1*  4/2007 Okitsu et al. ................ 707/200

OTHER PUBLICATIONS

Chazapis et al., Global-scale peer-to-peer file services with DFS, pp. 251-258, 2007 IEEE, IEEE Catalog No. 07EX2005C, ISBN 1-4244-1560-8, Library of Congress 2007905096, 8th IEEE/ACM international Conference on Grid Computing, Sep. 19-21, 2007, Austin, Texas.*

* cited by examiner

*Primary Examiner* — Huawen Peng
(74) *Attorney, Agent, or Firm* — Pattric J. Rawlins; Procopio, Cory, Hargreaves & Savitch LLP

(57) ABSTRACT

Disclosed herein is a system and method that that allows device administrators to set disk quotas for each share of a server. Quotas are set and enforced per share. The quota specifies the total disk space the share may consume on the device. When a share reaches or exceeds the set quota the share can no longer be written to.

15 Claims, 11 Drawing Sheets

CONSUMER SHARE QUOTA FEATURE

FIELD OF THE INVENTION

This invention relates to computer storage products, and more particularly to enforcing disk quotas on file server shares.

BACKGROUND

Disk capacity continues to increase at a phenomenal rate. At the same time, however, managing the disk space, especially for disks that may be used by more than one user (e.g., shares), is becoming more troublesome. Even though disk capacity has increased greatly, it is still finite and may be consumed prematurely or by a small number of users if mismanaged. Thus, administrators and the like are left with the task of determining how to assign and enforce disk quotas.

Currently, Linux-based quota solutions allow for quotas to be set and enforced at the user level. How much disk space each user is allowed to consume and what to do if a user attempts to exceed the user's disk space is determined in advance by these user-based quotas.

However, there is currently no means for setting and enforcing quotas on shares in Linux-based systems. Setting quotas on shares is desirable because it prevents users from filling the disk capacity and tracks disk capacity needs for future planning. As used herein, the term "share" is synonymous with a shared folder or shared files. Accordingly, there is a need for a system and method for setting and enforcing quotas on Linux-based file server shares.

SUMMARY

Described herein is a quota feature that enforces share-based quotas on a Linux file server. The quota feature may be implemented using a Linux File System in User Space ("FUSE") device which sets quotas and implements restrictions to shares that exceed their quota.

When a share is determined to exceed its quota, all users of the share are notified that the share is temporarily unavailable. The share is then moved to another file system location. The FUSE-based file system is then mounted at the old file system location so that all accesses to the share go through the FUSE-based file system. Share users are then notified to resume using the share.

When the FUSE-based file system is in place and share quota is exceeded, all writes to the share are rejected. Reads and other allowable input/output ("I/O") are passed on to the share at its new location in the file system.

In one embodiment, a system for implementing share-based quotas on a Unix-like file server includes a first file system and a quota module. The first file system includes a share and the quota module includes a FUSE device configured to write a virtual file system. The share has a size quota and the quota module monitors the share.

In another embodiment, a method for implementing share-based quotas on a Unix-like file server includes determining a share at a first location has reached a size quota and moving the share to a second location, wherein the second location is on a virtual file system and accesses to the share are received by the virtual file system.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description it will become apparent to one skilled in the art how to implement the invention in various alternative embodiments and alternative applications. However, although various embodiments will be described herein, it is understood that these embodiments are presented by way of example only, and not limitation. As such, this detailed description of various alternative embodiments should not be construed to limit the scope or breadth of the present invention as set forth in the appended claims.

The present invention relates to a disk quota feature that allows device administrators to set disk quotas for each share of the system. Quotas are set and enforced per share. The quota specifies the total disk space the share may consume on the device. When a share reaches or exceeds the set quota the share can no longer be written to.

This approach allows enforcing of quotas on Linux-based file server shares. Any consumer of the share will still have full read and delete access to the share. I/Os to the share that increases disk space consumption are restricted at the file system level. In some embodiments, the present disk quota feature applies only to internal storage, as Universal Serial Bus ("USB") and External Serial Advanced Technology Attachment ("ESATA") shares generally do not support quotas.

User Interface Module

Figure 1:
FIG. 1 illustrates an example settings page for a user interface, according to an embodiment.

FIG. 1 is an exemplary settings page 100 for a user interface, which embodies aspects of the present invention. In an embodiment, settings page 100 includes a settings tab 110, which may be used to perform configuration changes on the related storage device (not shown). Also included on settings page 100 is a plurality of icons 120 which link to various settings, e.g., date and time, printers, etc. By clicking on an icon 120, an administrator can view or modify the settings for the particular icon 120. A quota icon 125 is one of the plurality of icons 120 shown.

Figure 2:
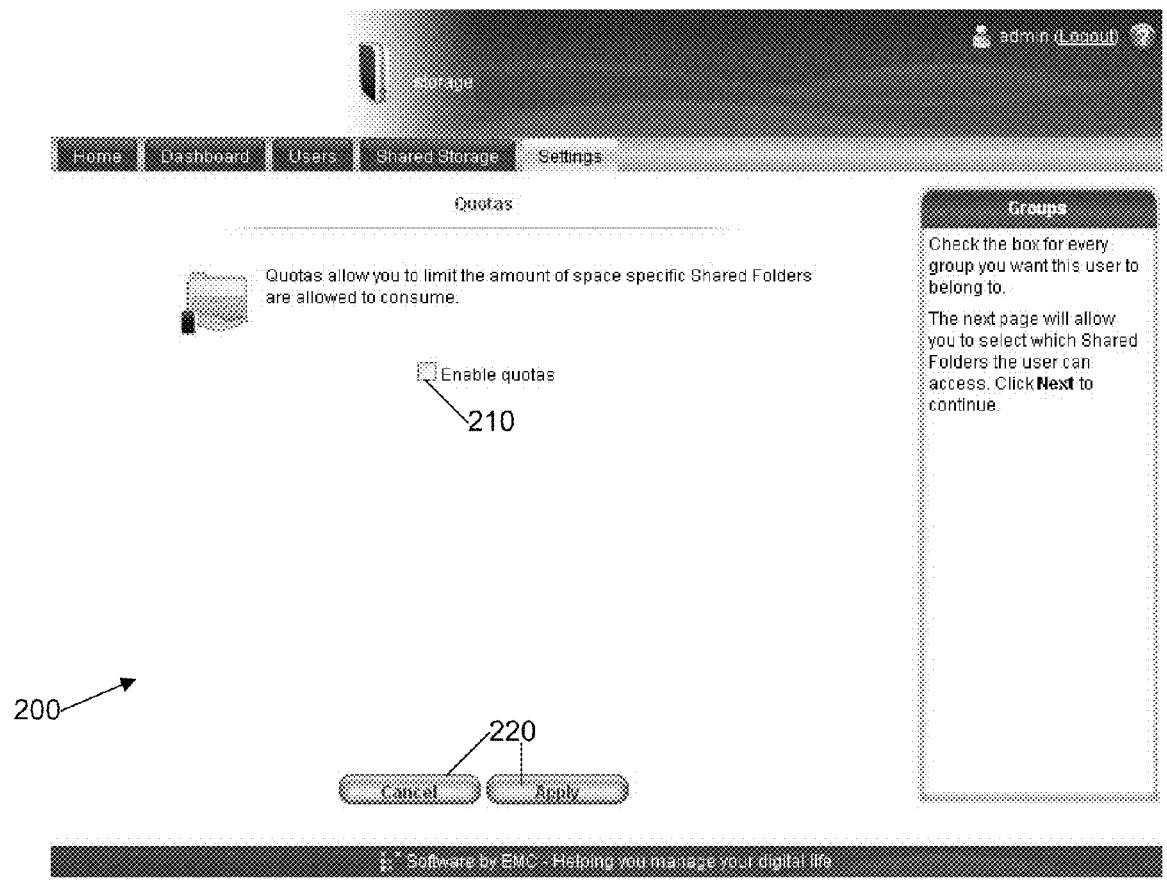
FIG. 2 illustrates an example quotas page for a user interface where quotas have not been enabled, according to an embodiment.

When an administrator clicks on the quota icon 125, he directed to the quotas page 200 shown in FIG. 2. As shown in FIG. 2, quotas page 200 include a check box 210 for enabling quotas. By checking box 210, the administrator can determine which group(s) a user belongs to. The administrator must select the appropriate entry button 220 to then cancel or apply the enabled quotas.

Figure 3:
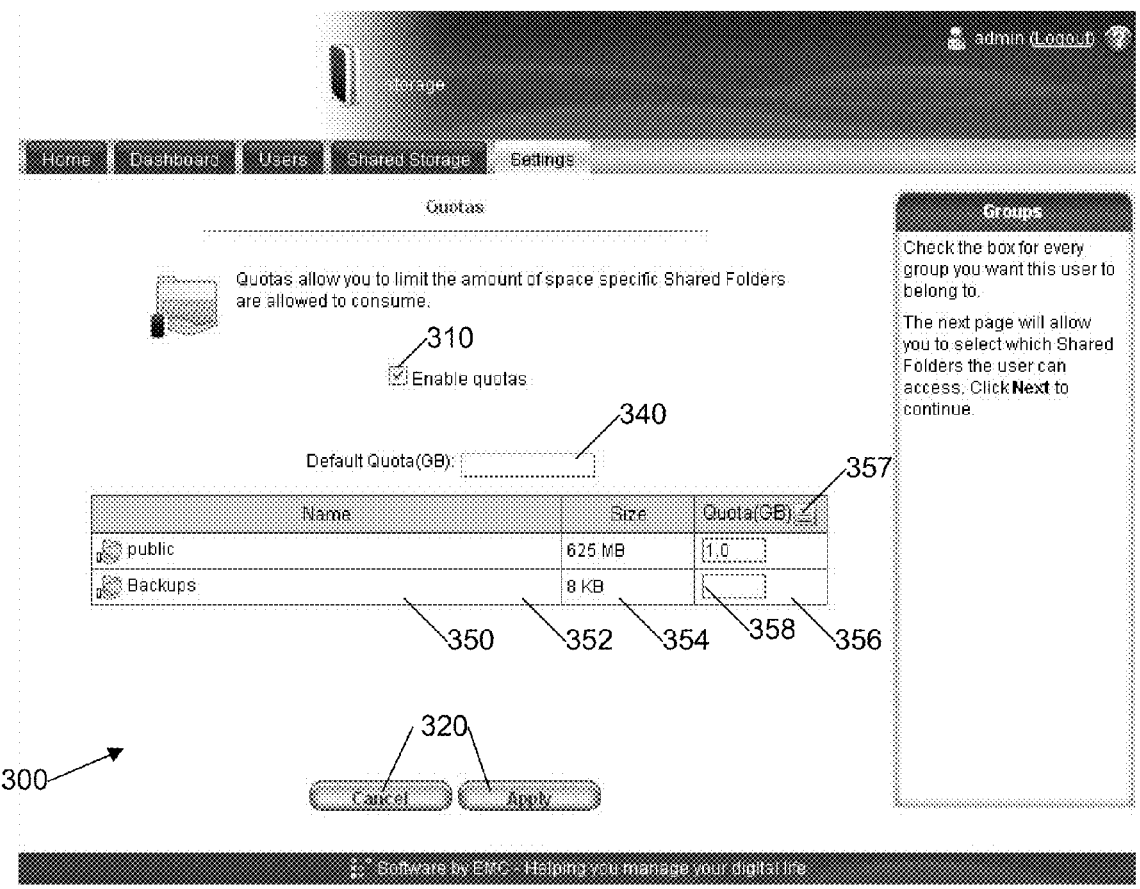
FIG. 3 illustrates an example quotas page for a user interface where quotas have been enabled, according to an embodiment.

Once the check box 210 is checked and the administrator selects entry button 220 to apply the quotas, the administrator is directed to the quotas page 300 shown in FIG. 3. Quotas page 300 includes a check box 310 for enabling quotas and entry buttons 320 for canceling or applying the enabled quotas. Quotas page 300 includes a default quota entry box 340 that allows the administrator to enter the size of the default quota. For example, as shown in FIG. 3, the default quota may be entered on the order of gigabytes (GB).

Quotas page 300 also includes a quota table 350. Quota table 350 includes a folder name column 352, a folder size column 354, and a folder quota column 356. Folder quota column 356 includes a quota icon 357 and a quota entry box 358 for each folder, where the administrator may enter the size of the quota for each folder. As shown, quota entry box 358 allows the quotas to be entered on the order of GB. In one embodiment, 0.1 GB is the minimum allowed quota setting and is also the minimum increment for quota settings. It should be noted that administrators cannot set a single share quota larger than the total disk size; thus the maximum setting is the maximum size of storage on the device. A help box (not shown) may indicate that the maximum setting is limited to the size of storage on the device. In some embodiments, a pop-up (not shown) prevents range violation by not allowing the administrator to enter a quota that is larger than the size of storage on the device.

In an embodiment, the default quota is the quota value that will be applied to all new shares. Checking the quota icon 357 in the folder quota column 356 will cause the quota settings in the quota table 350 for all shares to be set to the default quota. The administrator can still change individual share quota settings after clicking the quota icon 357. Quota settings are not applied until the apply entry button 320 is pressed. Canceling out of the page 300 keeps the share quota setting unchanged. In an embodiment, unchecking check box 310 disables quotas and the administrator is directed back to quotas page 200.

In general, share quotas are disabled by default and must be enabled by an administrator. When quotas are enabled, share quotas are displayed in quota table 350 and can be modified by administrators. By default each share does not have a quota and can consume unlimited disk space up to the maximum space available on the device. In some embodiments, disabling quotas removes all quota settings. Share quota settings are not remembered when quotas are re-enabled. In a preferred embodiment, the administrator establishes the quotas for shares prior to making the shares available to users.

Figure 4:
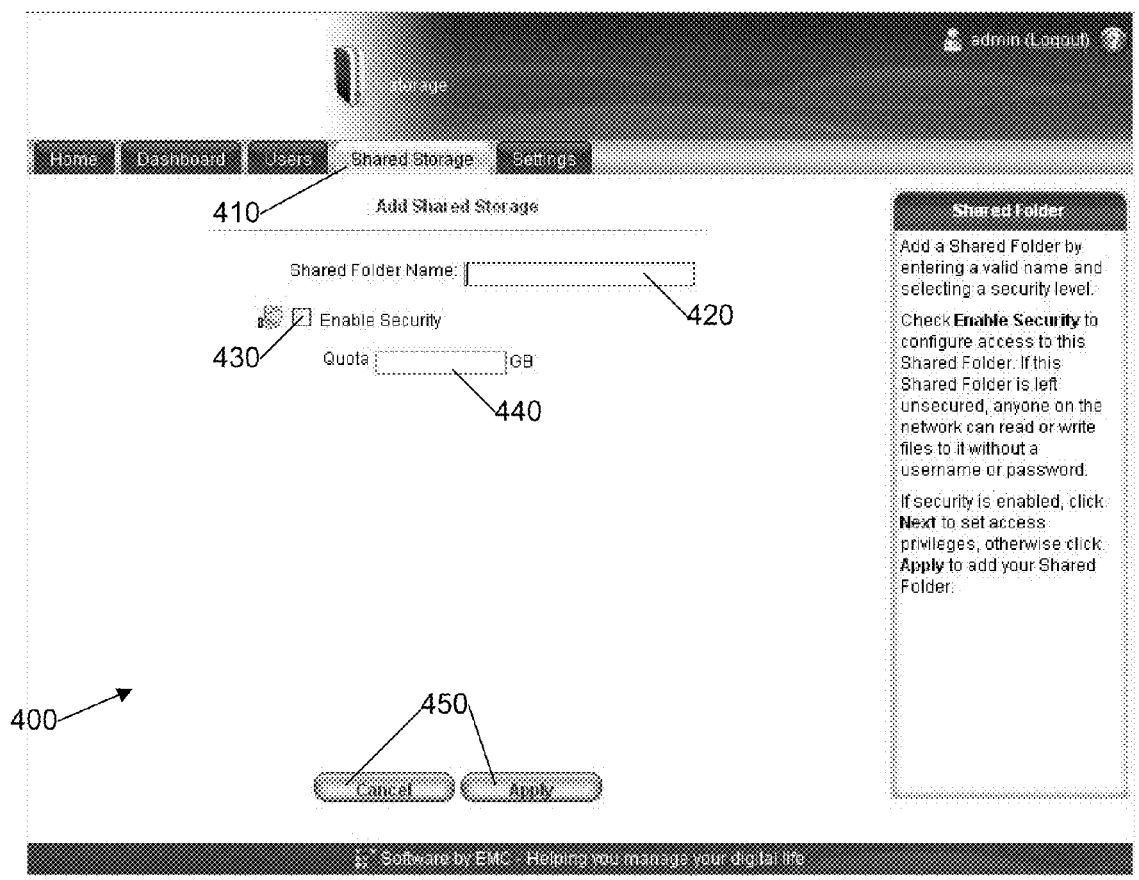
FIG. 4 illustrates an example shared storage page for a user interface where a shared folder is added, according to an embodiment.

Turning now to FIG. 4, when a new share is created, an option to set the new share's quota is displayed if quotas are enabled. If quotas are disabled the "Set Share Quota" option does not exist. For example, as shown in FIG. 4, a shared storage page 400 includes a shared storage tab 410, a shared folder name entry box 420, and a check box 430 for enabling security. Check box 430 allows the administrator to configure access to the shared folder. If, for example, the shared folder is left unsecured, anyone on the network may read or write files to the folder without a username or password. Shared storage page 400 also includes a quota entry box 440 for setting the quota size and entry buttons 450 for canceling or applying the settings for shared storage page 400.

If quotas are enabled and the default quota has been set on quotas page 300, the quota value is the default quota value. However, as described above, the administrator may still modify the quota value.

Figure 5:
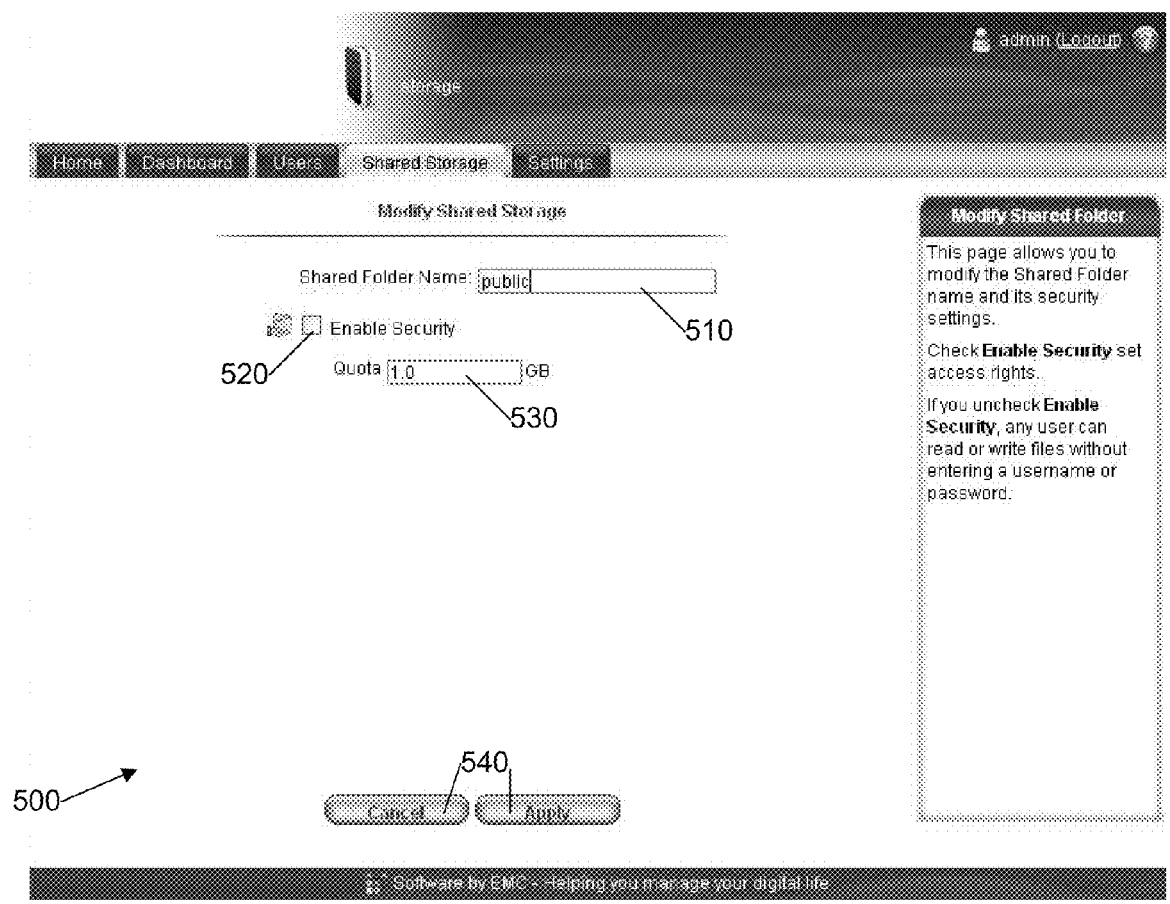
FIG. 5 illustrates an example shared storage page for a user interface where a shared folder is modified, according to an embodiment.

Also, if quotas are enabled, share quotas may be set from a modify share page 500, shown in FIG. 5. Modify share page 500 includes a shared folder name entry box 510, a check box 520 for enabling security, a quota entry box 530 for setting the quota size and entry buttons 540 for canceling or applying the settings for modify share page 500. In one embodiment, if a value is set for the quota, the quota value appears in the quota entry box 530. If a quota has not been set, the quota entry box 530 is blank.

It should be noted that in some embodiments, the mechanism employed to determine the disk usage of a share does not support knowing the exact share size in real time. Consequently, quotas are supported in a "soft" manner such that a share can exceed it's quota by some amount until it is detected to be over quota. At such time the share can no longer be written to. Only reads and IO resulting in freed space in the share is allowed until the share is under its quota, or the quota is set beyond the current share size.

In one embodiment, if a share's quota setting is set below the share's current disk consumption (e.g., multiple users are accessing a shared folder simultaneously such that the consumption exceeds the share's quota setting), the share becomes unwriteable until the share usage drops below the quota setting.

Generally, there is no problem with the sum of share quotas exceeding the size of the device storage. However, it is possible for all shares to be under quota with the device storage full. And, because quotas are implemented at the file system level, access to the device via Common Internet File System ("CIFS"), File Transfer Protocol ("FTP"), Network File System ("NFS") and the User Interface ("UI") are all subject to quotas.

Figure 6:
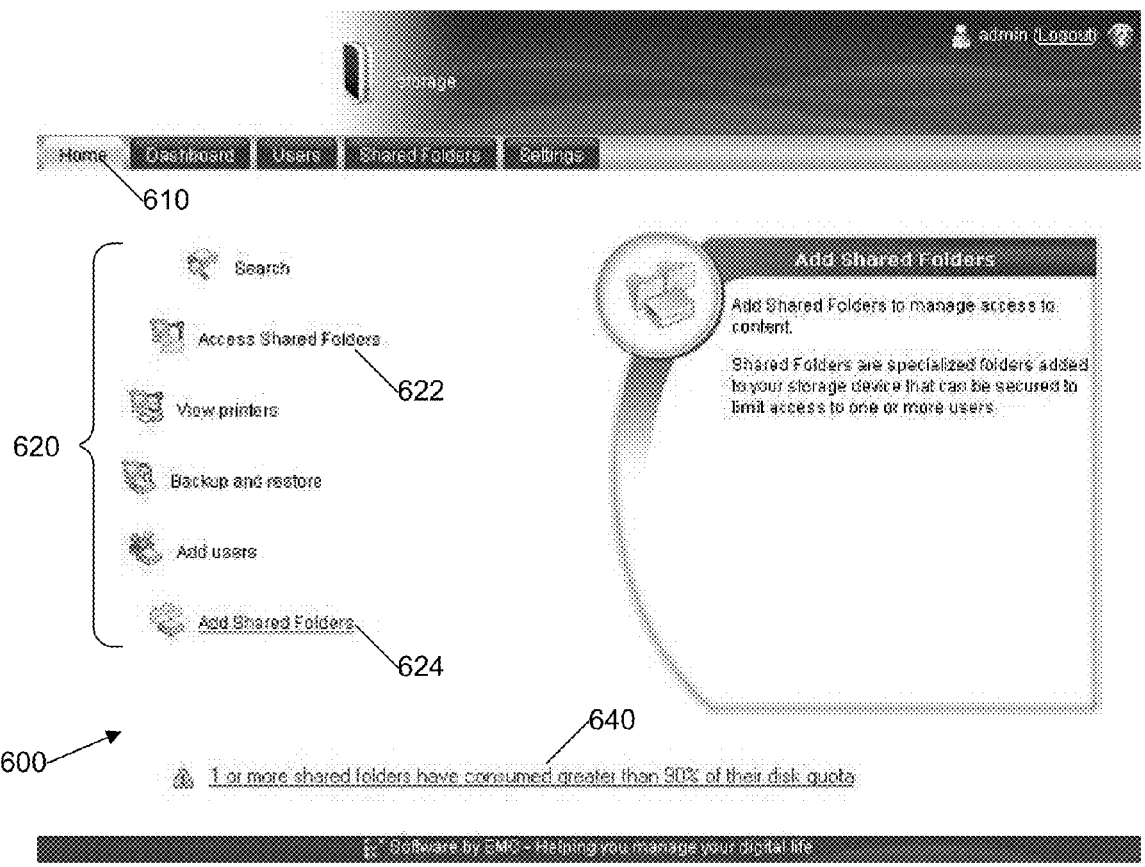
FIG. 6 illustrates an example home page for a user interface where a status message is displayed when a share has exceeded 90% of its quota, according to an embodiment.

Turning now to FIG. 6, a home page 600 is shown. Home page 600 includes a home tab 610, which may be used to perform configuration changes on the related storage device (not shown). Also included on home page 600 is a plurality of icons 620 such as access shared folders icon 622 and add shared folders icon 624.

If a share consumes greater than 90% of its set quota, a status message 640 is displayed alerting the administrator that the share exceeds 90% of its quota. In one embodiment, status message 640 displays the shared folder's current size and the percent consumed is highlighted (e.g., red, italicized font). Additionally, the folder icon may be changed (e.g., exclamation point on folder).

Figure 7:
FIG. 7 illustrates an example home page for a user interface where a status message is displayed when a share has exceeded its quota, according to an embodiment.

If a share exceeds its set quota, a status message 740 is displayed, as shown on home page 700 of FIG. 7. In one embodiment, status message 740 displays the shares that are at 100% of their quota. Status message 740 may be highlighted and the folder icon may be changed, similar to status message 640.

Figure 8:
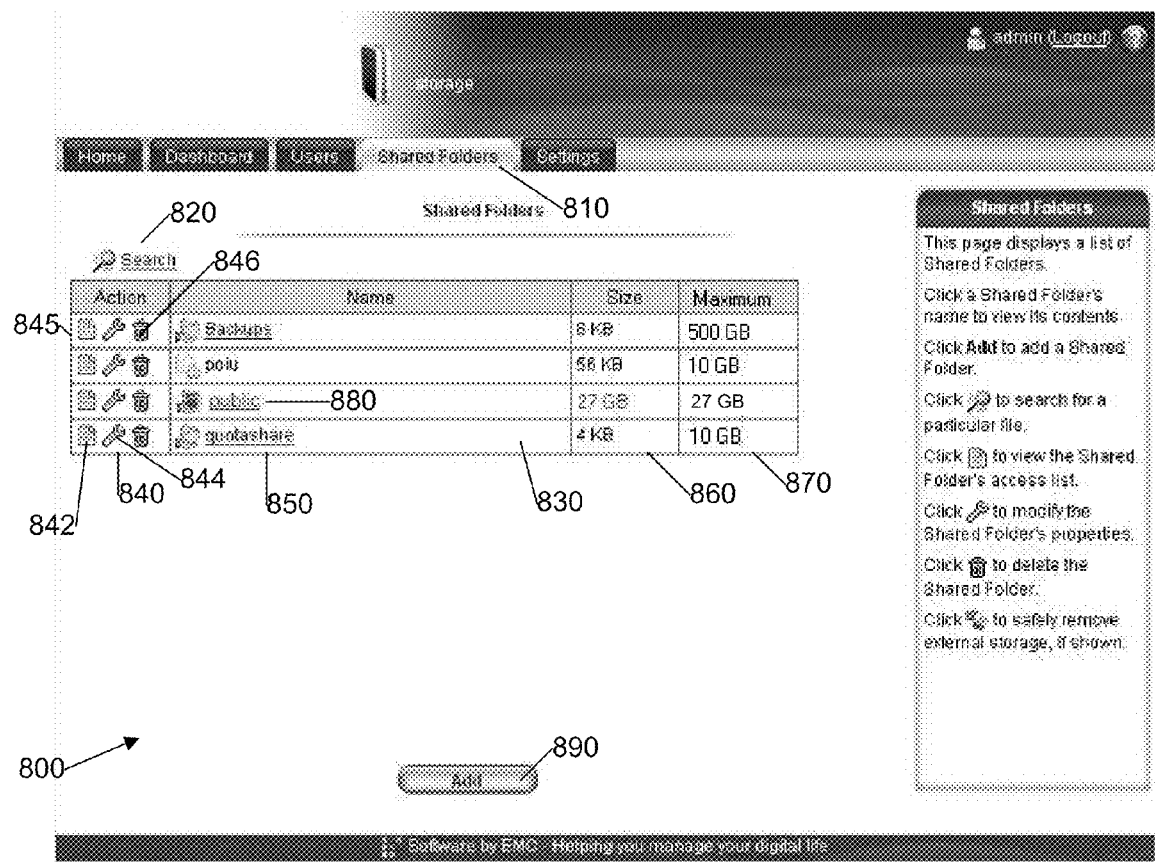
FIG. 8 illustrates an example shared folders page for a user interface, according to an embodiment.

Clicking on either of the status messages 640, 740 or icons 620, 720 will take the administrator to a shared folders page 800, as shown in FIG. 8. Shared folders page 800 includes a shared folders tab 810, a search icon 820, a shared folders table 830, and an add entry button 890. Clicking on search icon 820 allows the administrator to search for a particular file. Add entry button 890 allows the administrator to add a shared folder.

Shared folders table 830 includes an action column 840, a folder name column 850, a folder size column 860, and a folder maximum size column 870. Clicking a shared folder's name in folder name column 850 allows the administrator to view the shared folder's contents.

Action column 840 includes a plurality of icons 845 for viewing/modifying the folders, such as a view icon 842, modify icon 844, and delete icon 846. View icon 842 allows an administrator to view the shared folder's access list. Modify icon 844 allows the administrator to modify the shared folder's properties. Delete icon 846 allows the administrator the delete the shared folder.

As shown in FIG. 8, folder public 880 is exceeding 90% of its maximum size because its size is at 27 GB while the maximum size is set at 27 GB. In some embodiments, folder maximum size column 870 reflects the quota, if the quota is set. In other embodiments, folder maximum size column 870 reflects the remaining space on the disk, if the quota is not set.

Figure 9:
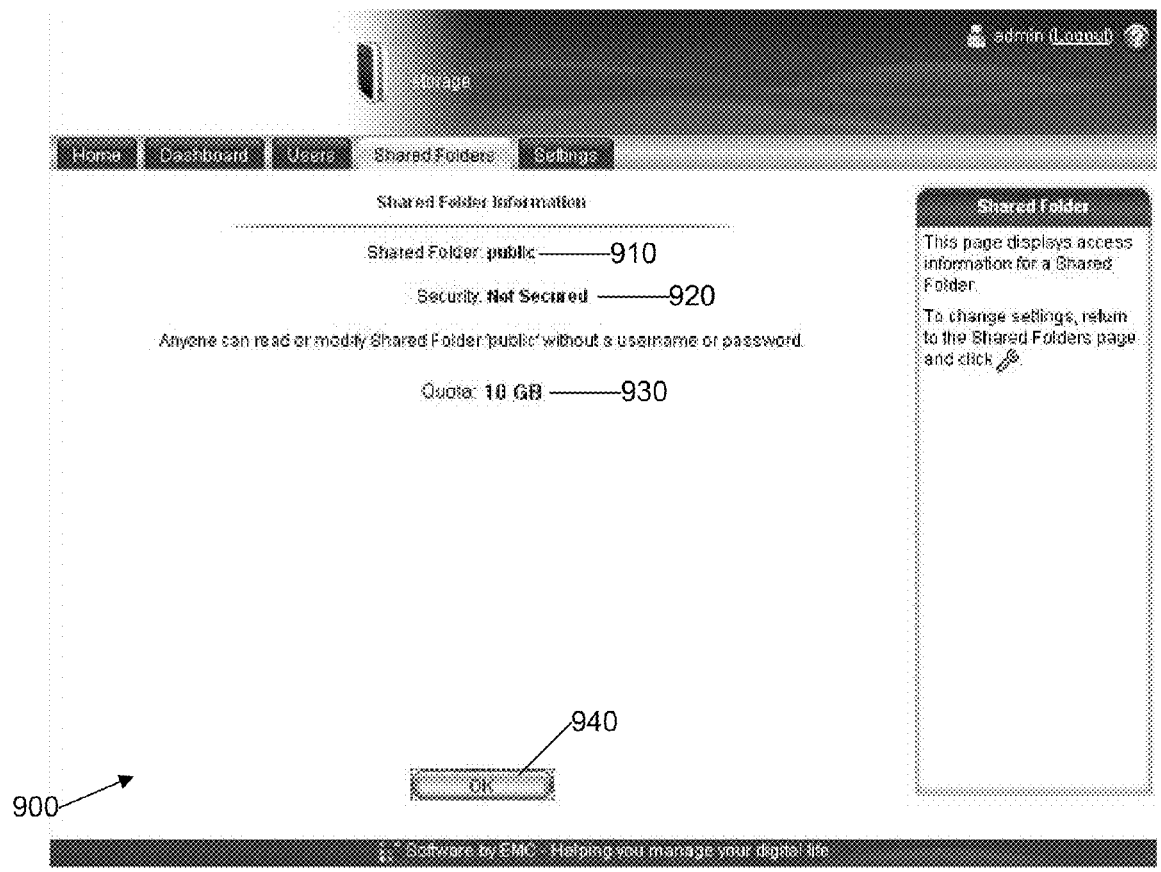
FIG. 9 illustrates an example shared folder information page for a user interface, according to an embodiment.

Clicking on the view icon 842 or modify icon 844 will take the administrator to a shared folder information page 900, shown in FIG. 9. Folder information page 900 includes access information for the shared folder. For example, in some embodiments, folder information page 900 includes a folder type field 910, letting the administrator know whether the folder is a public or private folder. Folder information page 900 may also include a security field 920, a quota field 930, and an entry button 940, such as the ok button shown. Generally, enabling/disabling quotas and setting of share quotas is only available to administrators.

In an embodiment, a status check is performed nightly and on each boot. If any shares are at 90% or more of their quotas an email is generated and sent to the email notification address. Also, a system status warning message may be displayed indicating a share(s) has exceeded 90%, or exceeded 100% of its quota, such as status messages 640, 740. Additionally, email may be generated in response to the display of the user interface system status warning message. In some embodiments, email will only be sent if the quota status has changed since the previous quota email alert.

The share quota settings are preferably stored on the storage volume. Thus, if the drive set is moved to another device, the quotas settings will be maintained on the new device. In an embodiment, share quota settings are not maintained across protection type changes. However, if quotas are enabled prior to the protection change, they are enabled after the protection type change, but all share quotas are set to zero (no quota).

It should be appreciated that the mechanism employed to determine the disk usage of a share does not necessarily support knowing the exact share size in real time. Thus, quotas are supported in a "soft" manner such that a share can exceed it's quota by some amount until it is detected to be over quota. At such time the share can no longer be written to. Only reads and I/O resulting in freed space in the share is allowed until the share is under its quota, or the quota is set beyond the current share size.

In summary, the present quota system allows administrators to enable/disable quotas, display/modify quotas, and report over-quota status. In some embodiments, an audit log entry is created whenever the following events occur: enable quotas, disable quotas, share over-quota, share under-quota, change to quota status.

In an embodiment, the present quota system is implemented using a Linux FUSE package. For example, the Linux FUSE package may be used to write instructions to the over-quota shares. FUSE is a loadable kernel module for Linux operating systems that allows non-privileged users to create their own file systems without editing the kernel code. This is achieved by running the file system code in user space, while the FUSE module only provides a "bridge" to the actual kernel interfaces.

FUSE is particularly useful for writing virtual file systems. Unlike traditional file systems, which essentially save data to and retrieve data from disk, virtual file systems do not actually store data themselves. Virtual files systems act as a view or translation of an existing file system or storage device. In principle, any resource available to FUSE implementation can be exported as a file system.

The Linux inotify feature may be used to determine current share consumption. In some embodiments, share folder sizes are calculated at intervals based on share usage, determined using the Linux inotify tool. When a new share size is calculated, the quota system may be notified to compare that size against the set quota for that share.

Figure 10:
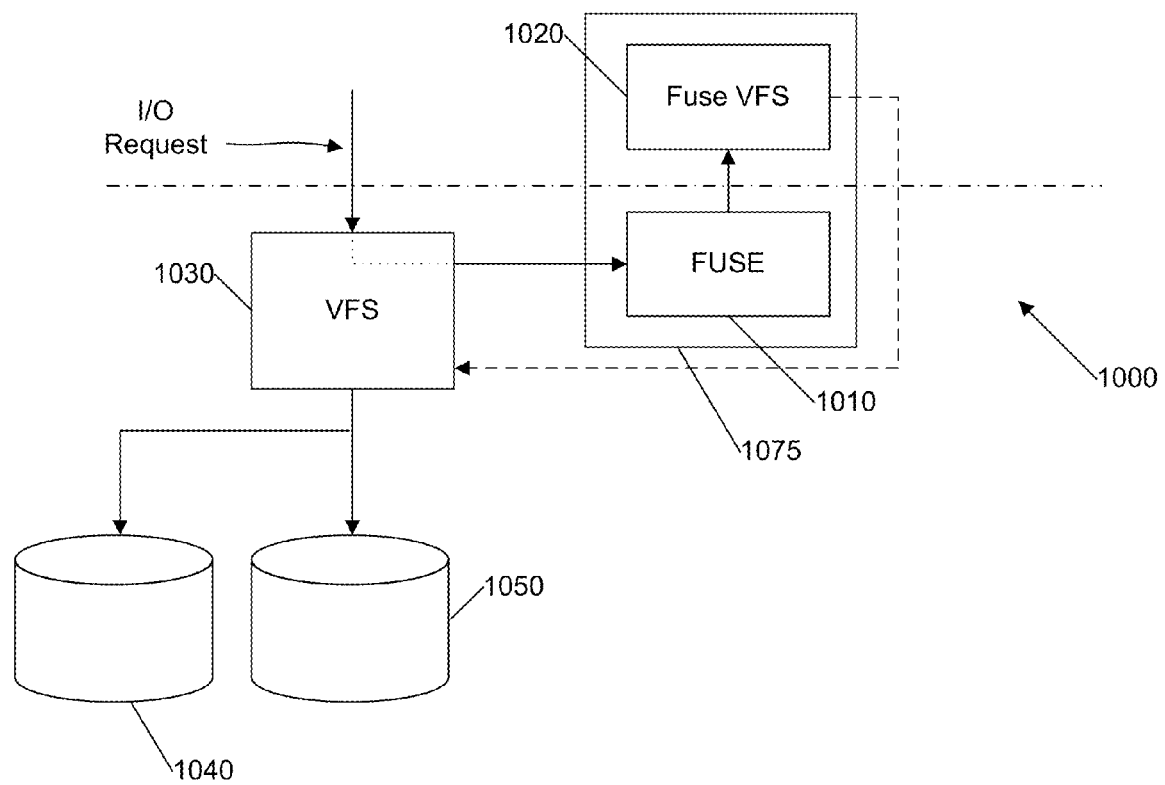
FIG. 10 is a block diagram of the system architecture for implementing the FUSE-based file system, according to an embodiment.

Referring to FIG. 10, a block diagram of the system architecture for implementing the FUSE based file system for handling the quota feature is shown. System architecture 1000 includes the FUSE device 1010 and a FUSE virtual file system ("VFS") 1020. In one embodiment, FUSE device 1010 utilizes FUSE VFS 1020 to handle the write restriction to over-quota shares.

In a preferred embodiment, quota module 1075 is contained within system architecture 1000. Also included in system architecture 1000 is a virtual file system ("VFS") 1030. In one embodiment, VFS 1030 is a Linux VFS. Generally, Linux VFS 1030 virtualizes the interface to the various file systems supported by Linux including FUSE VFS 1020 and the actual file system used to store data 1050.

Quota module 1075 monitors an existing share that is managed by Linux VFS 1030. Quota module 1075 utilizes the Linux inotify tool to determine the current size of the share, as discussed above.

In a preferred embodiment, all file systems requests (e.g., read, write, etc.) first go to Linux VFS 1030, which then forwards on the request to the appropriate file system. For example, as shown, FIG. 10 depicts the I/O path of an over quota share. The I/O request originates from the system into Linux VFS 1030, which, because the share is over quota, routes the request to FUSE device 1010 and FUSE VFS 1020.

When quota module 1075 detects that an existing share reaches or exceeds a predetermined size (e.g., its quota), quota module 1075 moves the share. Quota module 1075 does this by creating a new file system (depicted as FUSE VFS 1020 in FIG. 10) using FUSE device 1010 and moving the share from a first (original) file location 1040 to a second (new FUSE) file location 1050. In a preferred embodiment, the first file location is on a real file system.

After the share is moved to the FUSE VFS 1020, future requests for reads, deletions and other I/Os are passed through the FUSE VFS 1020, back to Linux VFS 1030 and then to the file system that handles the data (not shown) and where the share now resides (i.e., second file location 1050). Any write requests are rejected or denied by FUSE VFS 1020. Thus, when a request comes to Linux VFS 1030 to modify a share, Linux VFS 1030 routes the request to the actual file system for handling (e.g., the original file system or the new file system).

It should be appreciated that when a share is not over quota, Linux VFS 1030 routes the request to first file location 1040. When a share is over quota, Linux VFS 1030 routes the request to second file location 1050, after sending the request to quota module 1075 and quota module 1075 redirecting the request back to Linux VFS 1030.

In some embodiments, when quota module 1075 detects that an existing share has reached or exceeded its quota, users of the share are notified that the share is unavailable. After the share is moved from first file location 1040 to second file location 1050, users of the share are notified that the share is once again available.

The user interface, as depicted in FIGS. 1-9, displaying the functionality of the quota module is designed with the intent to keep the interface between services as clean and well defined as possible with the consideration that future architectural change to software may involve separating the services including the quota module into individual processes. With this in mind, the quota module implements the following quota functionality:

Initialize quotas
Enable and disable quotas
Set and get quota usage and limits
Set and get default quota value
Report quota usage
Determine if quota enabled
Determine if share space available
Handle for various events of concern to quotas Quota Module Functionality In an embodiment, initialize quotas is a quota module internal function (dm_quotas_init( )) invoked at boot or quota module restart time. If quotas are enabled, it reads the size and quotas for all shares and determines if any shares are over-quota. If shares are over-quota, the quota module assures that Sohofs 1020 is invoked for that particular share. The quota module also registers for quota-related events.

In an embodiment, enabling and disabling quotas are implemented in dm_interface.c. Enabling and disabling quotas use the dm.fifo.in interface to the quota module thread to issue the request, dm_enable_quotas( ) and dm_disable_quotas( ), respectively. Dm_enable_quotas( ) sets a flag to enabled and registers for the various events handled by quotas. Dm_disable_quotas( ) sets a flag to disabled, unregisters for events, sets all quotas to zero, and un-restricts any over-quota shares.

The following interfaces are implemented in dm_interface.c

```
dm_set_quotas(dm_quota_list_t *quota_list)
dm_get_quotas(dm_quota_list_t **quota_list)
```

Where dm_quota_list_t is:

```
typedef struct dm_quota_list {
    int num_shares; // number of entries in the share[ ] array
    dm_share_quota_t share[1]; // array of user
    quota entries} dm_quota_list_t;
and
typedef struct dm_share_quota {
    char name[48]; // share name
    uint64_t quota; // quota in bytes
    uint64_t used; // bytes currently used} dm_share_quota_t;
```

In one embodiment, dm_set_quotas(quota_list) scans the quota_list, setting each share quota to that specified in the 'quota' field. Quotas for shares not in the list are not set. In some embodiments, share quotas default to 0 when quotas are enabled which is equivalent to "no quota". The 'used' field may be ignored. Shares that become over or under quota due to the new setting are restricted or un-restricted appropriately.

When complete, dm_set_quotas( ) calls dm_quota_report( ) if any user quotas were changed.

Dm_get_quotas(quota_list) allocates a quotas list (to be deallocated by the administrator) containing the name, quota setting, and space used for each share on the device.

The default quota value is that applied to newly created shares.

```
int dm_set_default_quota(uint64_t default_quota)
int dm_get_default_quota(uint64_t *default_quota)
```

In one embodiment, dm_report_quota_usage( ) scans for shares that are within 90% of their quota or have exceeded their quota limit. If found, dm_report_quota_usage( ) creates the status message "1 or more share have consumed greater than 90% of their quota limit" or "1 or more shares have exceeded their quota limit". If no shares are greater that 90%, any existing status messages are cleared. Dm_report_quota_usage( ) may also create an email sent to the system email notification address detailing each share that exceeds 90% quota usage. In a preferred embodiment, one email will be sent each time the 90% or >100% status of shares change.

In some embodiments, dm_is_quota_enabled reports if quotas are enabled or disabled. Dm_share_space_available( ) returns the amount the share is under quota.

Event handlers include, for example:
SVC_EVENT_SCHED_FSCHANGE
SVC_EVENT_SHARE_SIZE_UPDATE
SVC_EVENT_SHARE_CREATE
SVC_EVENT_SHARE_DELETE
SVC_EVENT_STORAGE_UP
SVC_EVENT_STORAGE_DOWN SVC_EVENT_SCHED_FSCHANGE occurs when a file system has significantly changed to warrant action. A SVC_EVENT_FOLDER_SIZE_DIRTY event is triggered to recalculate the size of the share.

SVC_EVENT_SHARE_SIZE_UPDATE occurs when the share size has been updated. The share is then checked for over-quota status.

SVC_EVENT_SHARE_CREATE is triggered after a new share is created. The share is given quota of zero, or the default quota value, if set.

SVC_EVENT_SHARE_DELETE is triggered before a share is deleted. If the share is over-quota the share status is changed to under-quota.

SVC_EVENT_STORAGE_UP is triggered after storage is mounted. The share status is checked.

SVC_EVENT_STORAGE_DOWN is triggered before storage is unmounted. Any over-quota shares are changed to under-quota.

Figure 11:
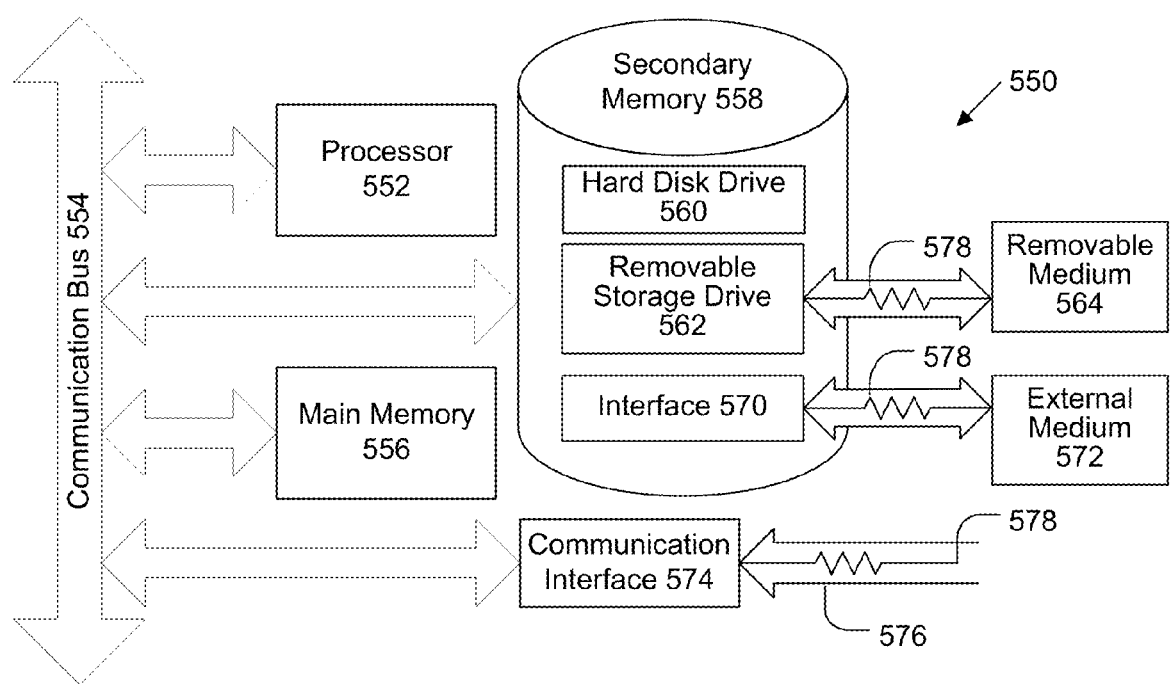
FIG. 11 is a block diagram illustrating an example computer system that may be used in connection with various embodiments described herein.

FIG. 11 is a step diagram illustrating an example computer system 550 that may be used in connection with various embodiments described herein. For example, the computer system 550 may be used in conjunction with the FUSE device 1010, previously described with respect to FIG. 10. Other computer systems and/or architectures may also be used as will be understood by those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. For example, while the FUSE package has been described as for use with Linux to achieve the quota share feature, any Unix-like operating system such as Linux and MacOS may be used. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A system for implementing share-based quotas on a Unix-like file server comprising:
at least one processor;
a first file system comprising a share, the share comprising at least one shared folder or shared file, the share used by a plurality of users;
a quota module that, when executed by the at least one processor,
receives a size quota for the share,
monitors the size of the share, and
in response to a determination that the size of the share reaches or exceeds the size quota,
automatically creates a File-System-in-User-Space (FUSE) virtual file system, and
moves the share to the FUSE virtual file system; and
a virtual file system that
receives a request for at least a portion of the share,
if the share has not reached or exceeded the size quota, routes the request to the first file system, and,
if the share has reached or exceeded the size quota, routes the request to the FUSE virtual file system, wherein the FUSE virtual file system denies write requests that increase the size of the share and allows read requests to the share while the share is at or has exceeded the size quota.

2. The system according to claim 1, wherein the quota module monitors the size of the share by calculating the share size at intervals.

3. The system according to claim 2, wherein the size of the share is further based on share usage.

4. The system according to claim 1, wherein the FUSE virtual file system allows requests for deletions to the share.

5. The system according to claim 1, wherein the FUSE virtual file system allows requests to the share which result in freed space in the share.

6. The system according to claim 1, wherein the Unix-like file server is a Linux file server.

7. The system according to claim 1, wherein the quota module further:
notifies the plurality of users that the share is unavailable before moving the share to the FUSE virtual file system; and
notifies the plurality of users that the share is available after moving the share to the FUSE virtual file system.

8. A method for implementing share-based quotas on a Unix-like file server comprising:
determining a share on a first file system has reached or exceeded a size quota, the share comprising at least one shared folder or shared file, the share used by a plurality of users;
if the share has not reached or exceeded the size quota, routing one or more requests for at least a portion of the share to the first file system, and
in response to the determination that the share has reached or exceeded the size quota,
automatically creating a File-System-in-User-Space (FUSE) virtual file system,
moving the share to the FUSE virtual file system,
routing one or more requests for at least a portion of the share to the FUSE virtual file system, and
denying write requests that increase a size of the share and allowing read requests to the share while the share is at or has exceeded the size quota.

9. The method according to claim 8, wherein the FUSE virtual file system is implemented by a FUSE device.

10. The method according to claim 8, wherein the first file system is a real file system.

11. The method according to claim 8, further comprising notifying the plurality of users that the share is unavailable when the share is being moved to the FUSE virtual file system.

12. The method according to claim 8, further comprising notifying the plurality of users that the share is available after the share is moved to the FUSE virtual file system.

13. The method according to claim 8, further comprising allowing requests for deletions to the share while the share is at or has exceeded the size quota.

14. The method according to claim 8, further comprising allowing requests to the share, which result in freed space in the share, while the share is at or has exceeded the size quota.

15. A system for implementing share-based quotas on a Unix-like file server comprising:
 means for determining a share on a first file system has reached or exceeded a size quota, the share comprising at least one shared folder or shared file, the share used by a plurality of users;
 means for, in response to the determination that the share has reached or exceeded the size quota,
 automatically creating a File-System-in-User-Space (FUSE) virtual file system, and
 moving the share to the FUSE virtual file system; and
 means for
 receiving a request for at least a portion of the share,
 if the share has not reached or exceeded the size quota, routing the request to the first file system, and,
 if the share has reached or exceeded the size quota, routing the request to the FUSE virtual file system, wherein the FUSE virtual file system denies write requests that increase the size of the share and allows read requests to the share while the share is at or has exceeded the size quota.

* * * * *